United States Patent
Lee et al.

(10) Patent No.: US 11,086,383 B2
(45) Date of Patent: Aug. 10, 2021

(54) MOVING OBJECT SENSING CONTROL APPARATUS AND METHOD WITH POWER SAVING

(71) Applicant: Samsung Electro-Mechanics Co., Ltd., Suwon-si (KR)

(72) Inventors: Jong Woo Lee, Suwon-si (KR); Je Hyuk Ryu, Suwon-si (KR); Joo Yul Ko, Suwon-si (KR); Soo Woong Lee, Suwon-si (KR); Yong Woon Ji, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 24 days.

(21) Appl. No.: 16/737,193

(22) Filed: Jan. 8, 2020

(65) Prior Publication Data
US 2021/0096631 A1   Apr. 1, 2021

(30) Foreign Application Priority Data

Sep. 27, 2019   (KR) .......................... 10-2019-0119976

(51) Int. Cl.
*G06F 1/32*   (2019.01)
*G06F 1/3231*   (2019.01)
*G06F 1/3234*   (2019.01)

(52) U.S. Cl.
CPC ............ *G06F 1/3231* (2013.01); *G06F 1/325* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 5,498,958 A | * | 3/1996 | Tu ...................... | H03K 17/9525 324/207.16 |
| 2003/0020421 A1 | * | 1/2003 | Vu ........................... | G01D 3/08 318/442 |
| 2015/0084646 A1 | * | 3/2015 | Mirow ..................... | G01D 5/20 324/654 |
| 2018/0120083 A1 | * | 5/2018 | Reddy ...................... | G01B 7/30 |
| 2019/0128703 A1 | * | 5/2019 | Elliott ................... | H03K 5/1565 |
| 2020/0166380 A1 | | 5/2020 | Lee et al. | |

FOREIGN PATENT DOCUMENTS

JP    2001-124872 A    5/2001
KR    10-2020-0060195 A    5/2020

* cited by examiner

*Primary Examiner* — Paul B Yanchus, III
(74) *Attorney, Agent, or Firm* — NSIP Law (57) ABSTRACT

A moving object sensing control circuit includes: a control circuit configured to determine, based on a mode signal, whether to operate in a sensing mode or a power saving mode, and control, in the power saving mode, a sensing operation in a sensing stage and a standby operation in a standby stage; an LC oscillation circuit configured to generate an oscillation signal based on an impedance value corresponding to relocation of a moving object, by performing the sensing operation or the standby operation in response to control of the control circuit; and a sensing circuit configured to obtain a period count value of the sensing oscillation signal using a reference oscillation signal and a main oscillation signal, and output an output signal having movement information of the moving object based on the period count value, by performing the sensing operation in response to the control of the control circuit.

17 Claims, 7 Drawing Sheets

MOVING OBJECT SENSING CONTROL APPARATUS AND METHOD WITH POWER SAVING

CROSS-REFERENCE TO RELATED APPLICATIONS

This application claims benefit under 35 U.S.C. § 119(a) of Korean Patent Application No. 10-2019-0119976 filed on Sep. 27, 2019, in the Korean Intellectual Property Office, the entire disclosure of which is incorporated herein by reference for all purposes.

BACKGROUND

1. Field

The following description relates to a moving object sensing circuit apparatus and method with power saving.

2. Description of Related Art

In general, a moving object, such as a rotating body, has been used in various fields in devices such as a motor, a wheel switch of a wearable device, and the like, that are required to be miniaturized and slimmed. In accordance with such a trend, a sensing circuit that senses a position of the moving object has also been required to sense fine displacement of the moving object.

A sensing device according to the related art requires a precise signal of which a frequency is high and noise such as a jitter, or the like, is low, in a sensing operation based on a reference oscillation signal. For example, in the sensing device that performs sensing based on the reference oscillation signal, a method of sensing rotation of the rotating body by measuring a frequency of an input sensed signal using a reference clock having a high frequency may be used.

Such a sensing device according to the related art uses the reference clock having the high frequency, and the sensing method therefore consumes a large amount of power, and thus requires a large amount of power. In addition, in a case of such a sensing device using one sensing coil in order to sense the rotating body, when noise such as a jitter is included in a sensed signal of a measurement target, a sensing error may occur. In addition, an additional complex circuit is required to remove such noise, thereby increasing complexity of a design and manufacturing costs.

To resolve such problems, various sensing methods, such as an inductive sensing method, are currently being developed.

The inductance sensing method, and the like, which are currently being developed, require a function of reducing power when applied to a portable device, but do not possess such a function, which may be problematic.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a moving object sensing control circuit includes: a control circuit configured to determine, based on a mode signal, whether to operate in a sensing mode or a power saving mode, and control, in the power saving mode, a sensing operation in a sensing stage and a standby operation in a standby stage; an LC oscillation circuit configured to generate an oscillation signal based on an impedance value corresponding to relocation of a moving object, by performing the sensing operation in the sensing stage or the standby operation in the standby stage in response to control of the control circuit; and a sensing circuit configured to obtain a period count value of the sensing oscillation signal using a reference oscillation signal and a main oscillation signal, and output an output signal having movement information of the moving object based on the period count value, by performing the sensing operation in the sensing stage or the standby operation in the standby stage in response to the control of the control circuit.

The moving object sensing control circuit may further include a main oscillation circuit configured to generate the main oscillation signal by performing the sensing operation in the sensing stage or the standby operation in the standby mode in response to the control of the control circuit.

The control circuit may be further configured to control, in the standby stage, powering down of the main oscillation circuit and the LC oscillation circuit, and holding of the output signal.

The control circuit may be further configured to receive a set time signal or a synchronous clock signal during the standby stage, determine a sensing time of the sensing stage and a standby time of the standby stage based on the synchronous clock signal, control the sensing operation during the sensing time based on the set time signal, and control the standby operation during the standby time based on the set time signal.

The LC oscillation circuit may include: a first oscillation circuit configured to generate a first sensed oscillation signal based on a first impedance value corresponding to relocation of a first detected location of the moving object during the sensing operation; and a second oscillation circuit configured to generate a second sensed oscillation signal based on a second impedance value corresponding to relocation of a second detected location of the moving object during the sensing operation.

The sensing circuit may include: a frequency divider configured to divide a frequency of the reference oscillation signal and output a frequency-divided reference oscillation signal; a first period counting circuit configured to generate a first sensed signal having a first period count value counted using the frequency-divided reference oscillation signal with respect to the first sensed oscillation signal; a second period counting circuit configured to generate a second sensed signal having a second period count value counted using the frequency-divided reference oscillation signal with respect to the second sensed oscillation signal; and a calculation circuit configured to calculate the first and second sensed signals to generate the output signal.

The first period counting circuit may include: a first period counter configured to count a period of the frequency-divided reference oscillation signal using the first sensed oscillation signal to generate the first period count value for the frequency-divided reference oscillation signal; and a first filter configured to amplify the first period count value using an accumulated gain to generate a first amplified period count value and provide the first amplified period count value as the first sensed signal.

The second period counting circuit may include: a second period counter configured to count a period of the frequency-divided reference oscillation signal using the second sensed oscillation signal to generate the second period count value for the frequency-divided reference oscillation signal; and a second filter configured to amplify the second period count value using an accumulated gain to generate a second amplified period count value and provide the second amplified period count value as the second sensed signal.

The calculation circuit may be further configured to generate the output signal by dividing the first sensed signal by the second sensed signal.

The sensing stage and the standby stage may be repeated in an alternating manner.

In another general aspect, a moving object sensing control method of a moving object sensing control apparatus includes: initiating a power saving mode in response to the power saving mode being selected from among a sensing mode and the power saving mode based on a mode signal; performing a sensing operation using a main oscillation circuit, an LC oscillation circuit and a sensing circuit of the moving object sensing control apparatus during a sensing time in the power saving mode; performing a standby operation by holding a power-down state for each of the main oscillation circuit, the LC oscillation circuit and the sensing circuit during a standby time, after the sensing time, in the power saving mode; and re-initiating the sensing operation by controlling powering-on for each of the main oscillation circuit, the LC oscillation circuit and the sensing circuit after the standby time.

The moving object sensing control method may further include: receiving, after re-initiating the sensing operation, a termination signal indicating whether the sensing operation is to be terminated; and continuing with the sensing operation in response to the termination signal indicating that the sensing operation is not to be terminated, or terminating the sensing operation in response to the termination signal indicating that the sensing operation is to be terminated.

The performing of the sensing operation may include: initiating the sensing operation using the main oscillation circuit, the LC oscillation circuit and the sensing circuit; and continuing to perform the sensing operation until the sensing time elapses.

The performing of the standby operation may include: initiating the standby operation, after the sensing time elapses, to power down the main oscillation circuit and the LC oscillation circuit, and to hold an output signal of the sensing circuit; and continuing to perform the standby operation until the standby time elapses.

The re-initiation of the sensing operation may include powering on the main oscillation circuit, the LC oscillation circuit, and the sensing circuit.

The performing of the sensing operation may include: generating, by the LC oscillation circuit, a sensing oscillation signal based on an impedance value corresponding to relocation of a moving object, in response to control of the control circuit; and obtaining, by the sensing circuit, a period count value of the sensing oscillation signal using a reference oscillation signal and a main oscillation signal and outputting, by the sensing circuit, an output signal having movement information of the moving object on the basis of the period count value.

The control circuit may receive a set time signal or a synchronous clock signal during the standby stage, determine the sensing time and the standby time based on the synchronous clock signal, control the sensing operation during the sensing time based on the set time signal, and control the standby operation during the standby time based on the set time signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
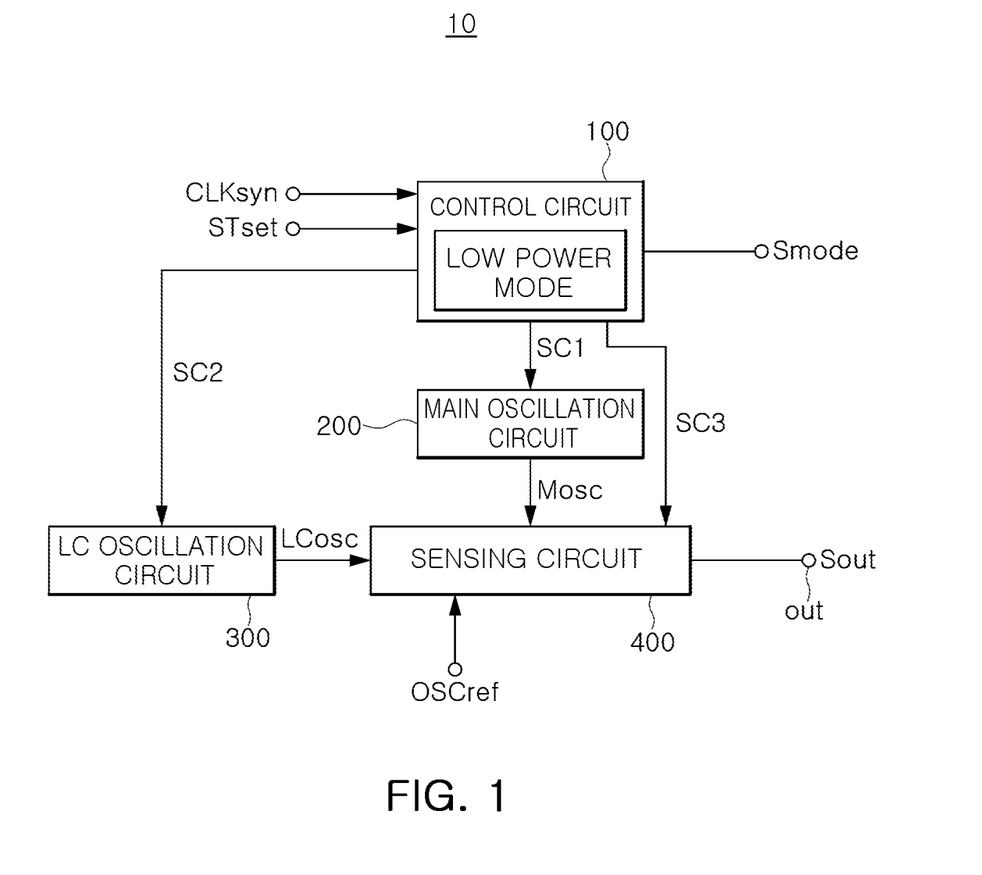
FIG. 1 is a view illustrating a moving object sensing control apparatus, according to an embodiment.

FIG. 1 is a view illustrating a moving object sensing control apparatus 10, according to an embodiment.

Referring to FIG. 1, the moving object sensing control apparatus 10 may include a control circuit or controller 100, an LC oscillation circuit 300, and a sensing circuit 400.

The control circuit 100 determines whether an operating mode of the control circuit 100 is a sensing mode or a power saving mode based on a mode signal Smode. In the case of the operating mode being the power saving mode, the control circuit 100 controls repetition of pre-determined sensing and standby operations. As an example, a high level of the mode signal Smode may represent the sensing mode while a low level of the mode signal Smode may represent the power saving mode. The moving object sensing control apparatus 10 may be a main control apparatus of a system, to which the mode signal Smode is applied, but it is not limited thereto.

As an example, the control circuit 100 may receive, as inputs, a synchronous clock signal CLKsyn from a reference clock, and a set time signal STset to determine a sensing time and a standby time in the power saving mode. The sensing time may be a duration of a sensing stage of the power saving mode, and the standby time may be a duration of a standby stage of the power saving mode.

For example, in the power saving mode, the control circuit 100 outputs a first control signal SC1 to control power down or power on (i.e., power up) of a main oscillation circuit 200 and outputs a second control signal SC2 to control power down or power on of the LC oscillation circuit 300. The control circuit 100 outputs a third control signal SC3 to hold an output signal of the sensing circuit 400 (e.g., stop a sensing operation) or release the hold of the output signal (e.g., initiate the sensing operation).

For example, in this disclosure, an operation of powering down may turn off a power switch installed between a corresponding block and a power, and an operation of powering on may turn on the power switch. Such operations of turning on and off of the power switch are well-known techniques, and detailed descriptions of such operations are thus omitted.

In a system to which the disclosure herein is applied, when the control circuit 100 is in the sensing mode and determines that there is no stimulus or a user's response for a certain period of time, for example, determines there is no operational response for 1 minute, the control circuit 100 performs an operation of switching to the power saving mode. In this case, the mode signal Smode has a low level corresponding to low_power_mode_enable, and an operation of the power saving mode is carried out.

Further, when returning to the sensing mode in the power saving mode, the mode signal Smode has a high level corresponding to low_power_mode_disable, which is a case in which the power saving mode is switched to the sensing mode, thereby carrying out an operation of the sensing mode.

The main oscillation circuit 200 carries out a sensing operation of a sensing stage (corresponding to the sensing time of the power saving mode) or a standby operation of a standby stage (corresponding to the standby time of the power saving mode) in response to the control of the control circuit 100 to generate a main oscillation signal Mosc. The main oscillation signal Mosc may be utilized in a calculation circuit 430 (FIG. 3) in a sensing circuit block. As an example, the main oscillation signal Mosc may be utilized as a clock signal of a register to save a calculation process and a final result data thereof in the register of the calculation circuit 430.

The LC oscillation circuit 300 carries out a sensing operation of the sensing stage or a standby operation of the standby stage in response to the control of the control circuit 100 to generate a sensing oscillation signal LCosc based on an impedance value corresponding to relocation of a moving body or moving object. As an example, the impedance value may be an inductance value or a capacitance value. Further, the inductance value is described as an example, but the impedance value not limited to the inductance value.

The sensing circuit 400 carries out a sensing operation of the sensing stage or a standby operation of the standby stage to obtain a period count value of the sensing oscillation signal LCosc using the main oscillation signal Mosc, in response to the control of the control circuit 100, or a period count value of a reference oscillation signal OSCref using the sensing oscillation signal LCosc. The sensing circuit 400 may also output an output signal Sout through an output terminal (OUT) having relocation information of the moving body based on the period count value.

As an example, the reference oscillation signal OSCref is a clock signal used in a counting operation of the sensing circuit 400, while the main oscillation signal Mosc is a clock signal used in a calculating operation of the sensing circuit 400.

During the sensing time of the power saving mode, the main oscillation circuit 200, the LC oscillation circuit 300 and the sensing circuit 400 may be powered on (or up). During the standby time of the power saving mode, the main oscillation circuit 200, the LCoscillation circuit 300, and the sensing circuit 400 may be powered down.

In the respective drawings of this disclosure, an unnecessarily overlapping description for components denoted by the same reference numerals and having the same functions will be omitted, and contents different from each other in the respective drawings will be described.

Figure 2:
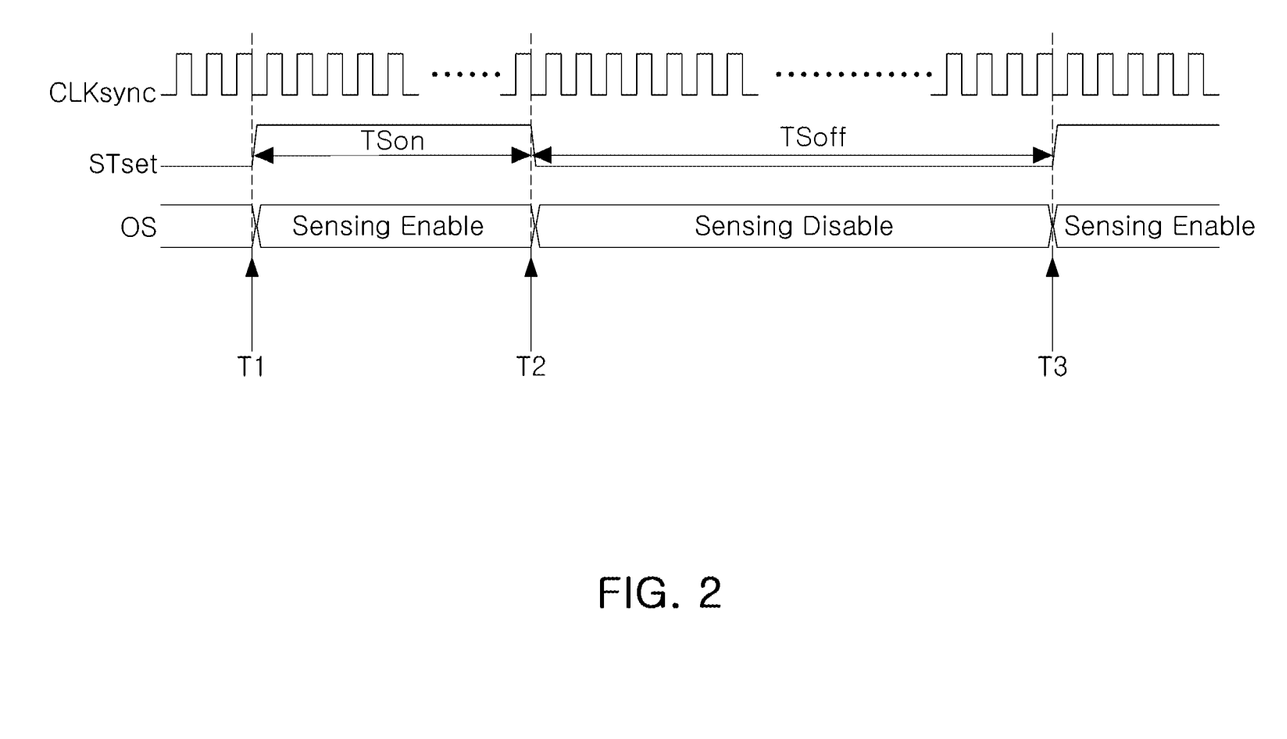
FIG. 2 is a timing chart illustrating a synchronous clock signal, a set time signal, and an operation status, according to an embodiment.

FIG. 2 is a timing chart illustrating a synchronous clock signal, a set time signal, and an operation status, according to an embodiment.

In FIG. 2, CLKsyn is a synchronous clock signal, which may be a reference clock signal OSCref input in the control circuit 100. The set time signal STset may be a signal input to the control circuit 100 or a signal generated based on the synchronous clock signal CLKsyn. The set time signal STset is a signal for determining the sensing time and the standby time in the power saving mode. OS refers to an operation state, and is in a sensing_enable state during the sensing time TSon and is in a sensing_disable state during the standby time TSoff.

As an example, when the synchronous clock signal CLKsyn is 32 KMz, the sensing time TSon may refer to a period of time for 16 cycles from T1 to T2, and the standby time TSoff may refer to a period of time for 48 cycles from T2 to T3. The sensing time TSon and the standby time TSoff in the power saving mode may be set differently according to environments of a system to which said times are applied, and thus are not limited to the example times provided herein. As in the above examples, the standby time TSoff in the power saving mode may be longer than the sensing time TSon, but is not limited to such examples.

The control circuit 100 may include a timer to count the sensing time TSon (T1 to T2) and the standby time TSoff (T2 to T3) in the power saving mode.

Referring to FIGS. 1 and 2, the control circuit 100 may control powering down of the main oscillation circuit 200 and the LC oscillation circuit 300 during the standby time TSoff in the power saving mode and holding of an output signal of the sensing circuit 400.

For example, the set time signal STset or the synchronous clock signal CLKsyn may be input to the control circuit 100 during the power saving mode.

As another example, when the set time signal STset is input to the control circuit 100, the control circuit 100 controls a sensing operation during the sensing time TSon for which the set time signal STset is high and a standby operation during the standby time TSoff for which the set time signal STset is low.

Figure 3:
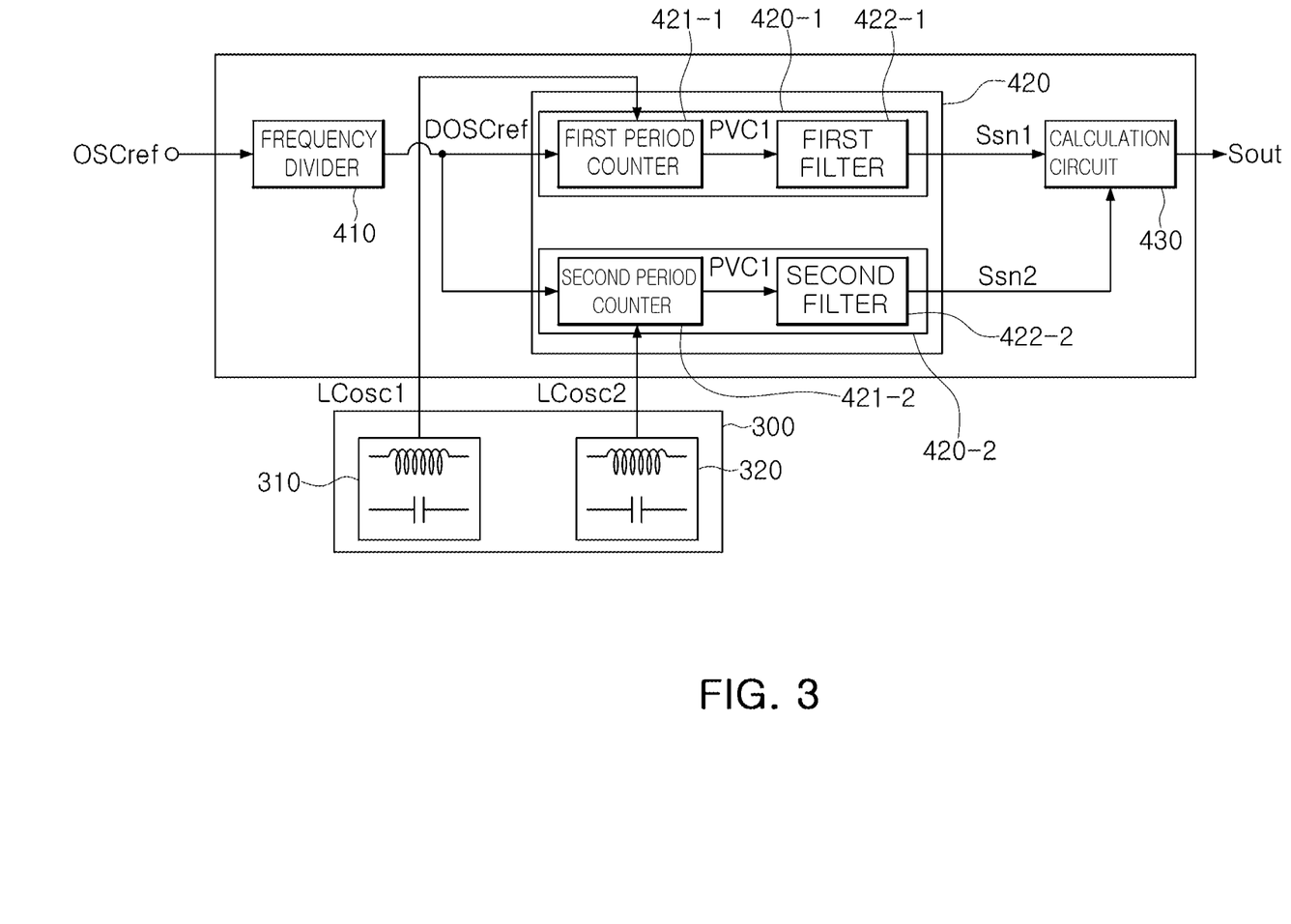
FIG. 3 is a view illustrating an LC oscillation circuit and a sensing circuit of FIG. 1, according to an embodiment.

FIG. 3 is a view illustrating examples of the LC oscillation circuit 300 and the sensing circuit 400 of FIG. 1.

Referring to FIG. 3, the LC oscillation circuit 300 may include a first oscillation circuit 310 and a second oscillation circuit 320.

As an example, the first oscillation circuit 310 may generate a first sensing oscillation signal LCosc1 based on a first impedance value (e.g., first inductance) corresponding to relocation of a first detection position of the moving body.

As an example, the second oscillation circuit 320 may generate a second sensing oscillation signal LCosc2 based on a second impedance value (e.g., second inductance) corresponding to relocation of a second detection position of the moving body.

As an example, the first and second detection positions of the moving body may have a detection pattern or a detection member formed for position detection. The moving body may be a crown of a smart watch or a lens carrier of a camera module. In this disclosure, the moving body is not limited to the aforementioned examples, and may correspond to any part requiring detection for a moving part in an electronic product.

In contrast, during a standby operation of the power saving mode, the LC oscillation circuit 300, and the first and second oscillation circuits 310 and 320 may not operate (e.g., may power down), thereby reducing power consumption.

The sensing circuit 400 may include a frequency divider 410, a first period counting circuit 420-1, a second period counting circuit 420-2, and a calculation circuit 430.

The frequency divider 410 may divide a frequency of the reference oscillation signal OSCref and output a frequency-divided reference oscillation signal DOSCref during the sensing operation.

The first period counting circuit 420-1 may generate a first sensed signal Ssn1 having a first period count value PCV1 counted using the frequency-divided reference oscillation signal DOSCref for the first sensed oscillation signal LCosc1.

The second period counting circuit 420-2 may generate a second sensed signal Ssn2 having a second period count value PCV2 counted using the frequency-divided reference oscillation signal DOSCref for the second sensed oscillation signal LCosc2.

The calculation circuit 430 may calculate the first sensed signal Ssn1 and the second sensed signal Ssn2 to generate an output signal Sout.

In contrast, during the standby operation of the power saving mode, the values of the frequency divider 410, and the first and second period counting circuits 420-1 and 420-2 are reset, and clocks of the divider and the counting circuit are set to zero (clock gating) to power down. The calculation circuit 430 holds the output signal and the clock is set to zero for configuring the calculation circuit 430 to power down.

As an example, the first period counting circuit 420-1 may include a first period counter 421-1 and a first filter 422-1.

The first period counter 421-1 may count a period of the frequency-divided reference oscillation signal DOSCref from the frequency divider 410 using the first sensed oscillation signal LCosc1 to generate the first period count value PCV1 for the frequency-divided reference oscillation signal.

The first filter 422-1 may amplify the first period count value PCV1 using a preset accumulated gain to generate a first amplified period count value and provide the first amplified period count value as the first sensed signal Ssn1.

The second period counting circuit 420-2 may include a second period counter 421-1 and a second filter 422-2.

The second period counter 421-2 may count a period of the frequency-divided reference oscillation signal DOSCref from the frequency divider 410 using the second sensed oscillation signal LCosc2 to generate the second period count value PCV2 for the frequency-divided reference oscillation signal.

The second filter 422-2 may amplify the second period count value PCV2 using a preset accumulated gain to generate a second amplified period count value and provide the second amplified period count value as the second sensed signal Ssn2.

The calculation circuit 430 operates using the main oscillation signal Mosc as a clock signal and generates the output signal Sout by dividing the first sensed Ssn1 signal by the second sensed signal Ssn2.

Figure 4A:
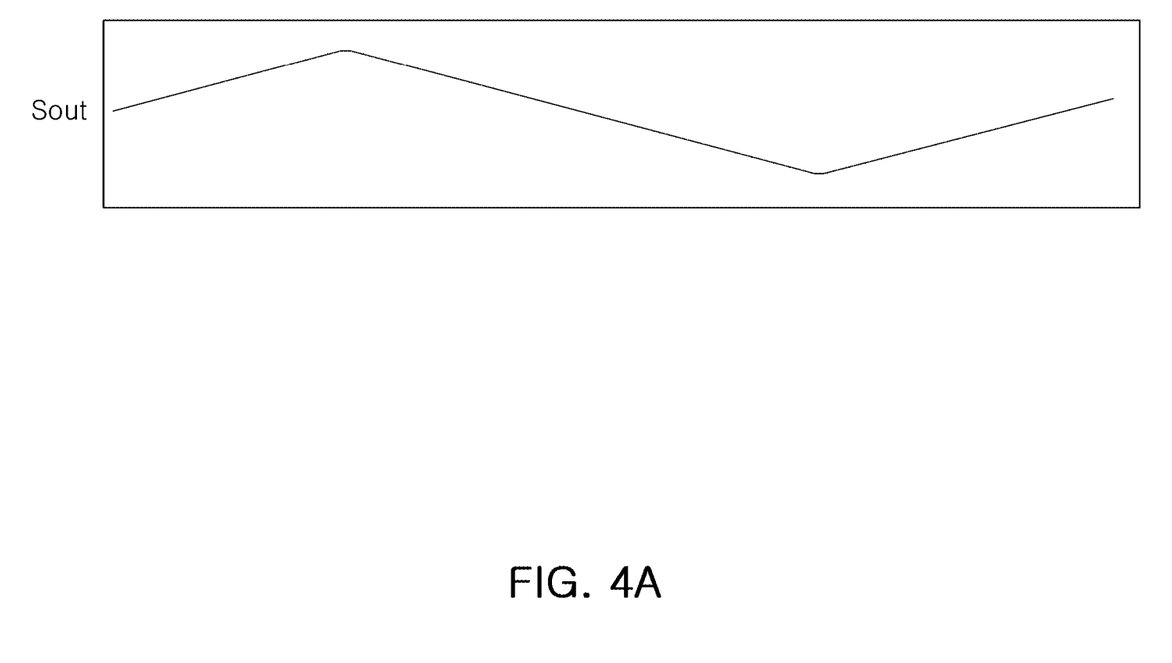
FIG. 4A is a view illustrating an example of an output signal in a sensing mode.
Figure 4B:
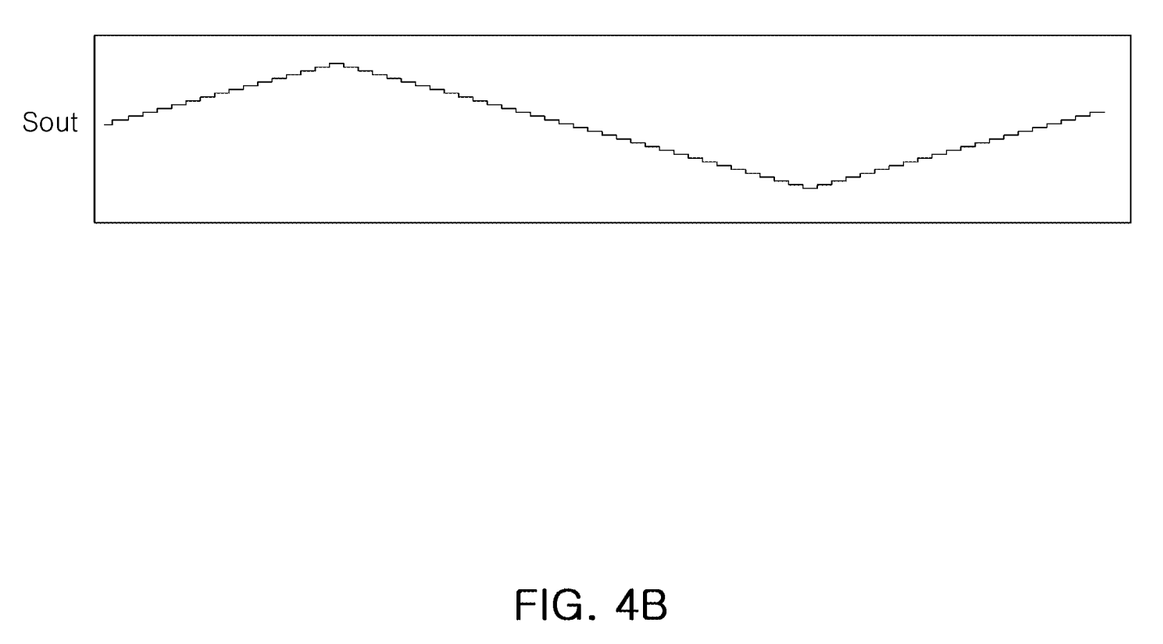
FIG. 4B is an example of an output signal in a power saving mode.

FIG. 4A is a view illustrating an example of an output signal in a sensing mode, and FIG. 4B is an example of an output signal in a power saving mode.

The output signal Sout illustrated in FIG. 4A is a signal waveform in the sensing mode while the output signal Sout illustrated in FIG. 4B is a signal waveform in the power saving mode. When compared, the output signals Sout illustrated in FIGS. 4A and 4B showed reduced power consumption while exhibiting similar sensing effects.

Figure 5:
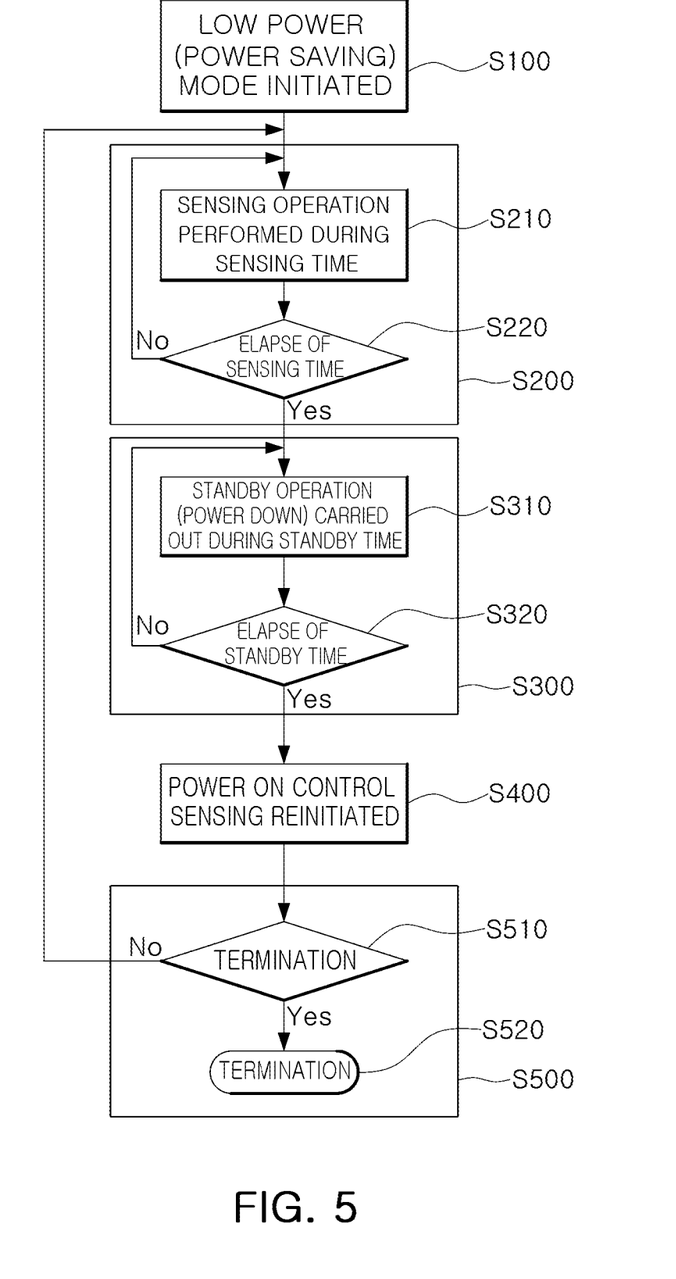
FIG. 5 is a view illustrating a moving object sensing control method, according to an embodiment.
Figure 6:
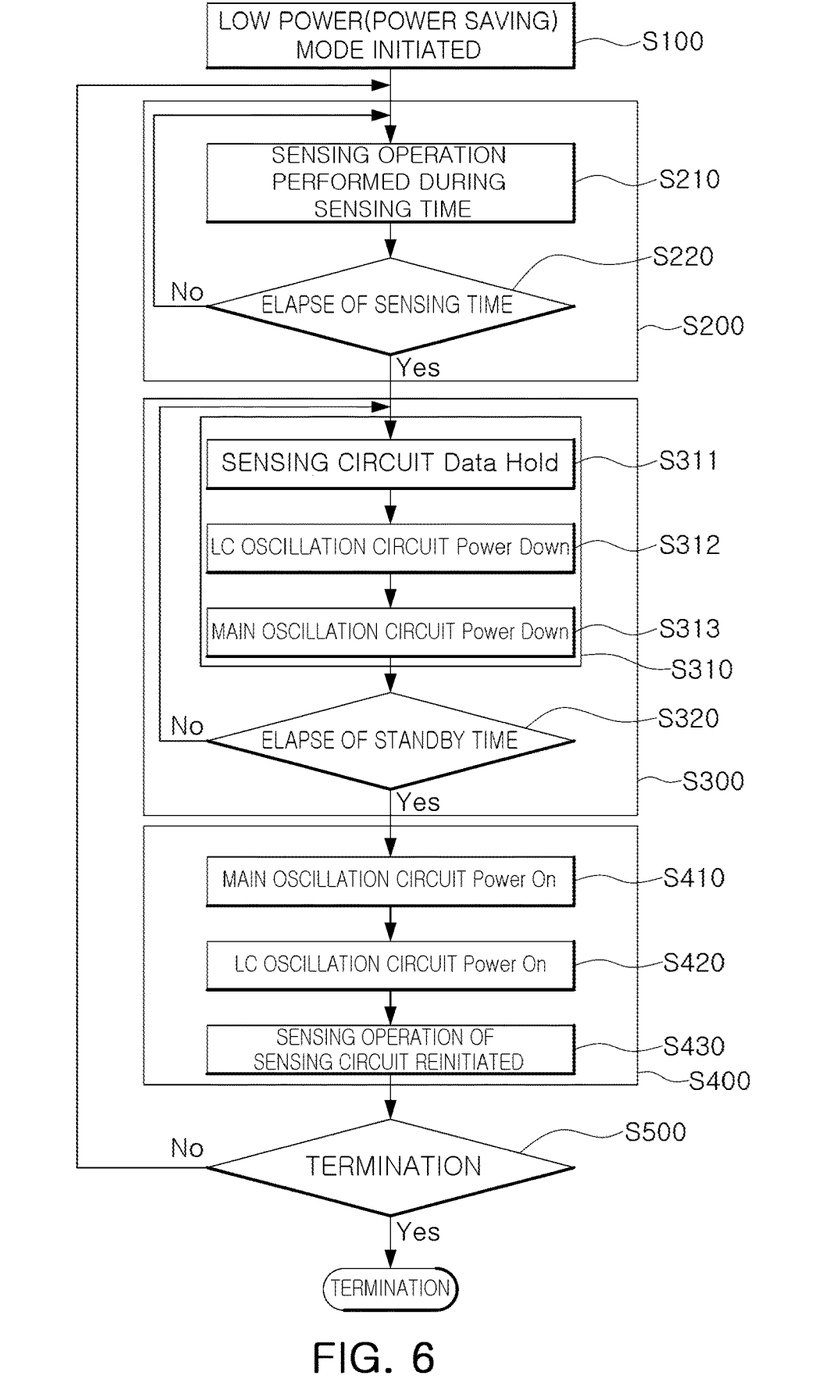
FIG. 6 is a flowchart illustrating FIG. 5 in detail, according to an embodiment.

FIG. 5 is a view illustrating a moving object sensing control method, according to an embodiment. FIG. 6 is a flowchart illustrating FIG. 5 in detail.

Hereinafter, for description of the moving object sensing control method, an operational description made above with reference to FIS. 1 to 4 may be applied. Accordingly, repeated descriptions may be omitted from the description of the moving body-sensing control method.

The moving object sensing control method illustrated in FIGS. 5 and 6 may be carried out in the moving object sensing control apparatus 10 including the control circuit 100, the main oscillation circuit 200, the LC oscillation circuit 300 and the sensing circuit 400, which are described above with reference to FIGS. 1 to 4.

Referring to FIG. 5, in accordance with the control of the control circuit 100, the power saving mode may be initiated in operation S100 when the power saving mode is selected from the sensing mode and the power saving mode based on a mode signal Smode.

Then, in operation S200, in accordance with the control of the control circuit 100, the main oscillation circuit 200, the LC oscillation circuit 300 and the sensing circuit 400 may be used to perform a sensing operation during the sensing time in the power saving mode.

After the sensing time, in operation S300, a standby operation holding a power down state of each of the main oscillation circuit 200, the LC oscillation circuit 300 and the sensing circuit 400 may be carried out during the standby time in the power saving mode, in accordance with the control of the control circuit 100.

After the standby time, in operation S400, powering on of the main oscillation circuit 200, the LC oscillation circuit 300 and the sensing circuit 400 is controlled by the control circuit 100 to re-initiate the sensing operation.

After the re-initiation of the sensing operation, a determination of whether to terminate the sensing operation is made in operation S510, in accordance with the control of the control circuit 100. In response to the control circuit 100 determining in operation S510 that the sensing operation is to be terminated, termination may be carried out in operation S520. Alternatively, in response to the control circuit 100 determining in operation S510 that the sensing operation is not to be terminated, the sensing operation S200 is performed again to continue the sensing operation.

As an example, when the sensing operation of the power saving mode is carried out in operation S200, the sensing operation of the power is initiated in operation S210 using the main oscillation circuit 200, the LC oscillation circuit 300 and the sensing circuit 400.

Within operation S200, the sensing operation is carried out in operation S210 until the elapse of the sensing time is observed in operation S210, and the sensing operation S210 is terminated when the elapse of the sensing time is observed in operation S220.

The standby operation S300, includes operations S310 and S320. During operation S310, the standby operation of the power saving mode is initiated in operation S311 after the sensing time, thereby powering down the main oscillation circuit 200 and the LC oscillation circuit 300 in operations S312 and S313, respectively, and carrying out the standby operation holding an output signal of the sensing circuit 400.

The standby operation S300 is maintained until the elapse of the standby is observed in operationS320, and the standby operation S300 is terminated when the elapse of the standby time is observed in operation S320.

As an example, when the elapse of the standby time is observed in operation S320, the main oscillation circuit 200 and the LC oscillation circuit 300 may be powered on in operations S410 and S420, respectively, within the operation S400. The sensing operation of the sensing circuit 400 may then be re-initiated in operation S430.

As an example, when the sensing operation is carried out in operation S200, the LC oscillation circuit 300 may generate the sensing oscillation signal LCosc based on an inductance value corresponding the relocation of the moving body in response to the control of the control circuit 100. In addition, the sensing circuit 400 may obtain a period count value of the sensing oscillation signal LCosc using the reference oscillation signal OSCref and output the output signal Sout having movement information of the moving body on the basis of each period count value.

The control circuit 100, according to an embodiment, may be embodied in a computing environment (e.g., a peripheral component interface (PCI), a USB connection, a FireWire (IEEE 1394) connection, an optical bus configuration, a network, or the like), in which a processor (e.g., a central processing unit (CPU), a graphics processing unit (GPU), a microprocessor, an application specific integrated circuit (ASIC), a field programmable gate array (FPGA), or the like), a memory (e.g., a volatile memory (e.g., a RAM, or the like), a non-volatile memory (e.g., a ROM, a flash memory, or the like), an input device (e.g., a keyboard, a mouse, a pen, a voice input device, a touch input device, an infrared camera, a video input device, or the like), an output device (e.g., a display, a speaker, a printer, or the like) and a communications interface unit (e.g., a MODEM, a network interface card (NIC), an integrated network interface, a wireless frequency transmitter/receiver, an infrared port, a USB interface unit, or the like) are interconnected with each other.

The computing environment may be embodied in a distributed computing environment, or the like, including a personal computer, a server computer, a handheld or laptop device, a mobile device (a mobile phone, a PDA, a media player, or the like), a multiprocessor system, a consumer electronic device, a minicomputer, a main frame computer, or the arbitrary aforementioned system or device, but is not limited thereto.

According to disclosed embodiment, a moving body-sensing device employing an impedance sensing (e.g., inductance generation), and the like, includes a power saving mode in addition to a sensing mode and periodically repeats a sensing operation and a standby state during the power saving mode. That is, the moving body-sensing device periodically repeats sensing on/off operations to reduce power consumption.

The control circuit/controller 100 in FIG. 1 and the calculation circuit 430 in FIG. 3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5 and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A moving object sensing control circuit, comprising:
a control circuit configured to:
  determine, based on a mode signal, whether to operate in a sensing mode or a power saving mode, and
  control, in the power saving mode, a sensing operation in a sensing stage and a standby operation in a standby stage;
an LC oscillation circuit configured to generate a sensed oscillation signal based on an impedance value corresponding to relocation of a moving object, by performing the sensing operation in the sensing stage or the standby operation in the standby stage in response to control of the control circuit; and
a sensing circuit configured to obtain a period count value of the sensed oscillation signal using a reference oscillation signal and a main oscillation signal, and output an output signal having movement information of the moving object based on the period count value, by performing the sensing operation in the sensing stage or the standby operation in the standby stage in response to the control of the control circuit,
wherein the control circuit is further configured to control, in the standby stage, powering down of the LC oscillation circuit and holding of the output signal.

2. The moving object sensing control circuit of claim 1, further comprising a main oscillation circuit configured to generate the main oscillation signal by performing the sensing operation in the sensing stage or the standby operation in the standby mode in response to the control of the control circuit.

3. The moving object sensing control circuit of claim 2, wherein the control circuit is further configured to control, in the standby stage, powering down of the main oscillation circuit.

4. The moving object sensing control circuit of claim 3, wherein the control circuit is further configured to receive a set time signal or a synchronous clock signal during the standby stage, determine a sensing time of the sensing stage and a standby time of the standby stage based on the synchronous clock signal, control the sensing operation during the sensing time based on the set time signal, and control the standby operation during the standby time based on the set time signal.

5. The moving object sensing control circuit of claim 4, wherein the LC oscillation circuit comprises:
a first oscillation circuit configured to generate a first sensed oscillation signal based on a first impedance value corresponding to relocation of a first detected location of the moving object during the sensing operation; and
a second oscillation circuit configured to generate a second sensed oscillation signal based on a second impedance value corresponding to relocation of a second detected location of the moving object during the sensing operation.

6. The moving object sensing control circuit of claim 5, wherein the sensing circuit comprises:
a frequency divider configured to divide a frequency of the reference oscillation signal and output a frequency-divided reference oscillation signal;
a first period counting circuit configured to generate a first sensed signal having a first period count value counted using the frequency-divided reference oscillation signal with respect to the first sensed oscillation signal;
a second period counting circuit configured to generate a second sensed signal having a second period count value counted using the frequency-divided reference oscillation signal with respect to the second sensed oscillation signal; and
a calculation circuit configured to calculate the first and second sensed signals to generate the output signal.

7. The moving object sensing control circuit of claim 6, wherein the first period counting circuit comprises:
a first period counter configured to count a period of the frequency-divided reference oscillation signal using the first sensed oscillation signal to generate the first period count value for the frequency-divided reference oscillation signal; and
a first filter configured to amplify the first period count value using an accumulated gain to generate a first amplified period count value and provide the first amplified period count value as the first sensed signal.

8. The moving object sensing control circuit of claim 6, wherein the second period counting circuit comprises:
a second period counter configured to count a period of the frequency-divided reference oscillation signal using the second sensed oscillation signal to generate the second period count value for the frequency-divided reference oscillation signal; and
a second filter configured to amplify the second period count value using an accumulated gain to generate a second amplified period count value and provide the second amplified period count value as the second sensed signal.

9. The moving object sensing control circuit of claim 6, wherein the calculation circuit is further configured to generate the output signal by dividing the first sensed signal by the second sensed signal.

10. The moving object sensing control circuit of claim 6, wherein the sensing stage and the standby stage are repeated in an alternating manner.

11. A moving object sensing control method of a moving object sensing control apparatus, comprising:
initiating a power saving mode in response to the power saving mode being selected from among a sensing mode and the power saving mode based on a mode signal;
performing a sensing operation using a main oscillation circuit, an LC oscillation circuit and a sensing circuit of the moving object sensing control apparatus during a sensing time in the power saving mode;
performing a standby operation by holding a power-down state for each of the main oscillation circuit, the LC oscillation circuit and the sensing circuit during a standby time, after the sensing time, in the power saving mode; and
re-initiating the sensing operation by controlling powering-on for each of the main oscillation circuit, the LC oscillation circuit and the sensing circuit after the standby time.

12. The moving object sensing control method of claim 11, further comprising:
receiving, after re-initiating the sensing operation, a termination signal indicating whether to terminate the sensing operation; and
continuing with the sensing operation in response to the termination signal indicating that the sensing operation is not to be terminated, or terminating the sensing operation in response to the termination signal indicating that the sensing operation is to be terminated.

13. The moving object sensing control method of claim 11, wherein the performing of the sensing operation comprises:
   initiating the sensing operation using the main oscillation circuit, the LC oscillation circuit and the sensing circuit; and
   continuing to perform the sensing operation until the sensing time elapses.

14. The moving object sensing control method of claim 11, wherein the performing of the standby operation comprises:
   initiating the standby operation, after the sensing time elapses, to power down the main oscillation circuit and the LC oscillation circuit, and to hold an output signal of the sensing circuit; and
   continuing to perform the standby operation until the standby time elapses.

15. The moving object sensing control method of claim 11, wherein the re-initiation of the sensing operation comprises:
   powering on the main oscillation circuit, the LC oscillation circuit, and the sensing circuit.

16. The moving object sensing control method of claim 11, wherein the performing of the sensing operation comprises:
   generating, by the LC oscillation circuit, a sensing oscillation signal based on an impedance value corresponding to relocation of a moving object, in response to control of a control circuit; and
   obtaining, by the sensing circuit, a period count value of the sensing oscillation signal using a reference oscillation signal and a main oscillation signal and outputting, by the sensing circuit, an output signal having movement information of the moving object on the basis of the period count value.

17. The moving object sensing control method of claim 16, wherein the control circuit receives a set time signal or a synchronous clock signal during the standby stage, determines the sensing time and the standby time based on the synchronous clock signal, controls the sensing operation during the sensing time based on the set time signal, and controls the standby operation during the standby time based on the set time signal.

* * * * *